US011295302B2

(12) United States Patent
Androulaki et al.

(10) Patent No.: US 11,295,302 B2
(45) Date of Patent: Apr. 5, 2022

(54) NETWORK SYSTEM AND METHOD FOR TRANSFERRING CRYPTOCURRENCIES BETWEEN A USER ACCOUNT AND A RECEIVING ACCOUNT

(71) Applicant: International Business Machines Corporation, Armonk, NY (US)

(72) Inventors: Elli Androulaki, Rueschlikon (DE); Andreas Kind, Rueschlikon (DE); Ioannis Koltsidas, Rueschlikon (DE)

(73) Assignee: International Business Machines Corporation, Armonk, NY (US)

( * ) Notice: Subject to any disclaimer, the term of this patent is extended or adjusted under 35 U.S.C. 154(b) by 1447 days.

(21) Appl. No.: 14/971,115

(22) Filed: Dec. 16, 2015

(65) Prior Publication Data
US 2016/0180338 A1 Jun. 23, 2016

(30) Foreign Application Priority Data
Dec. 17, 2014 (GB) .................................... 1422434

(51) Int. Cl.
*G06Q 20/38* (2012.01)
*H04L 9/32* (2006.01)
(Continued)

(52) U.S. Cl.
CPC ....... *G06Q 20/3829* (2013.01); *G06Q 20/065* (2013.01); *G06Q 20/10* (2013.01);
(Continued)

(58) Field of Classification Search
CPC . H04L 2209/56; H04L 9/3226; H04L 9/3228; H04L 9/3234; H04L 9/3247;
(Continued)

(56) References Cited

U.S. PATENT DOCUMENTS 5,903,880 A * 5/1999 Biffar ................. G06Q 20/3678
705/39
8,321,342 B2 11/2012 Marshall
(Continued)

FOREIGN PATENT DOCUMENTS

CN 101777222 A 7/2010
EP 2634738 A1 9/2013

OTHER PUBLICATIONS

Ron White, How Computers Work, Oct. 15, 2003, Paul Boger, Illustrated by Timothy Edward Downs, 7th Edition (Year: 2003).*
(Continued)

*Primary Examiner* — Mohammad A. Nilforoush
*Assistant Examiner* — Wodajo Getachew
(74) *Attorney, Agent, or Firm* — Harrington & Smith

(57) ABSTRACT

A user computing device generates a token while the user computing device is in an offline mode and not connected to an external network. The token includes information of an amount of cryptocurrency to be transferred from a user account to a receiving account and information of a first password for enabling the transfer. The token is signed by the user computing device with a private key while in the offline mode and the signed token is stored by the user computing device on a portable device. A receiving device receiving the signed token from the portable user storage device, authenticates a user corresponding to the user account based on the signed token, receives a second password, compares the first and second passwords for enabling the transfer, and transfers the amount of cryptocurrency from the user account to the receiving account based on the information included in the token.

18 Claims, 3 Drawing Sheets

(51) Int. Cl.
*G06Q 20/36* (2012.01)
*G06Q 20/06* (2012.01)
*G06Q 20/10* (2012.01)
*H04L 29/06* (2006.01)

(52) U.S. Cl.
CPC ....... *G06Q 20/3674* (2013.01); *H04L 9/3226* (2013.01); *H04L 9/3228* (2013.01); *H04L 9/3234* (2013.01); *H04L 9/3247* (2013.01); *H04L 63/083* (2013.01); *H04L 63/0823* (2013.01); *H04L 63/12* (2013.01); *H04L 2209/56* (2013.01)

(58) Field of Classification Search
CPC ... H04L 63/0823; H04L 63/083; H04L 63/12; G06Q 20/3829; G06Q 20/065; G06Q 20/10; G06Q 20/3674
USPC .......................................................... 705/71
See application file for complete search history.

(56) References Cited

U.S. PATENT DOCUMENTS

| | | | |
|---|---|---|---|
| 2006/0287004 A1* | 12/2006 | Fuqua | G06Q 20/0658 455/558 |
| 2007/0039042 A1* | 2/2007 | Apelbaum | H04L 9/14 726/6 |
| 2007/0255653 A1 | 11/2007 | Tumminaro et al. | |
| 2012/0197797 A1* | 8/2012 | Grigg | G07F 19/20 705/43 |
| 2012/0259778 A1* | 10/2012 | Banerjee | G06Q 20/3224 705/43 |
| 2013/0179337 A1 | 7/2013 | Ochynski | |
| 2013/0206834 A1* | 8/2013 | Itwaru | G06Q 20/401 235/379 |
| 2013/0238478 A1 | 9/2013 | Bruno | |
| 2014/0143142 A1* | 5/2014 | Talker | G06Q 20/36 705/41 |
| 2014/0156531 A1* | 6/2014 | Poon | G06Q 20/027 705/44 |
| 2015/0058618 A1* | 2/2015 | Jung | H04L 63/0807 713/155 |

OTHER PUBLICATIONS

Satoshi Nakamoto (Bitcoin: A Peer-to-Peer Electronic Cash System) ("Satoshi") (Year: 2008).*
Nakamoto, Satoshi, et al., "Bitcoin: A Peer-to-Peer Electronic Cash System", Nov. 2008 published by CoinDesk, 9 pgs.

* cited by examiner

NETWORK SYSTEM AND METHOD FOR TRANSFERRING CRYPTOCURRENCIES BETWEEN A USER ACCOUNT AND A RECEIVING ACCOUNT

CROSS-REFERENCE TO RELATED APPLICATIONS

This application claims the benefit of application number 1422434.9, filed in the United Kingdom (Great Britain, GB) on Dec. 17, 2014, the disclosure of which is hereby incorporated by reference in its entirety.

FIELD OF THE INVENTION

The invention relates to a network system and to a method for transferring cryptocurrencies between a user account and a receiving account.

BACKGROUND

Digital currencies gain more interest, for instance due to low costs for transferring currencies. Digital currencies can be for instance crypto currencies, like bitcoins, which provide a medium of exchange using cryptography to secure the transactions and to control the creation of new units. To make transactions using cryptocurrencies requires typically devices with internet access. However, cryptocurrencies may be of interest in particular for users who have no bank account and generally also have no internet access at home.

BRIEF SUMMARY OF THE INVENTION

Accordingly, in an exemplary embodiment herein, a network system and a method are described for transferring cryptocurrencies between a user account and a receiving account without requiring internet access for the user and while improving the security of such a transfer.

In an exemplary embodiment, a user computing device comprises a memory comprising computer-readable code, and a processor. The processor, in response to executing the computer-readable code, causes the user computing device to perform the following: generating a token while the user computing device is in an offline mode and not connected to an external network, the token comprising information of an amount of cryptocurrency to be transferred from a user account to a receiving account and information of a first password for enabling the transfer; signing the token with a private key while the user computing device is in the offline mode; and storing the signed token on a portable device.

In another exemplary embodiment, a method comprises: generating by a user computing device a token while the user computing device is in an offline mode and not connected to an external network, the token comprising information of an amount of cryptocurrency to be transferred from a user account to a receiving account and information of a first password for enabling the transfer; signing by the user computing device the token with a private key while the user computing device is in the offline mode; and storing by the user computing device the signed token on a portable device.

An additional exemplary embodiment is a computer program product comprising a non-transitory computer readable medium program comprising program code for executing the method of the previous paragraph.

In a further exemplary embodiment, a receiving device comprises a memory comprising computer-readable code, and a processor. The processor, in response to executing the computer-readable code causes the receiving device to perform the following: receiving a signed token from a portable user storage device, wherein the signed token has been generated by a user computer device while the user computer device was in an offline mode and not connected to an external network, the token comprising information of an amount of cryptocurrency to be transferred from a user account to a receiving account and information of a first password for enabling the transfer; authenticating a user corresponding to the user account based on the signed token; receiving a second password; comparing the first password and the second password for enabling the transfer, and transferring the amount of cryptocurrency from the user account to the receiving account based on the information included in the token.

In another exemplary embodiment, a method comprises: receiving by a receiving device a signed token from a portable user storage device, wherein the signed token has been generated by a user computer device while the user computer device was in an offline mode and not connected to an external network, the token comprising information of an amount of cryptocurrency to be transferred from a user account to a receiving account and information of a first password for enabling the transfer; authenticating by the receiving device a user corresponding to the user account based on the signed token; receiving by the receiving device a second password; comparing by the receiving device the first password and the second password for enabling the transfer, and transferring by the receiving device the amount of cryptocurrency from the user account to the receiving account based on the information included in the token.

An additional exemplary embodiment is a computer program product comprising a non-transitory computer readable medium program comprising program code for executing the method of the previous paragraph.

BRIEF DESCRIPTION OF THE DRAWINGS

In the following, exemplary embodiments of the present invention are described with reference to the enclosed figures.

Similar or functionally similar elements in the figures have been allocated the same reference signs if not otherwise indicated.

DETAILED DESCRIPTION OF THE EMBODIMENTS

Figure 1:
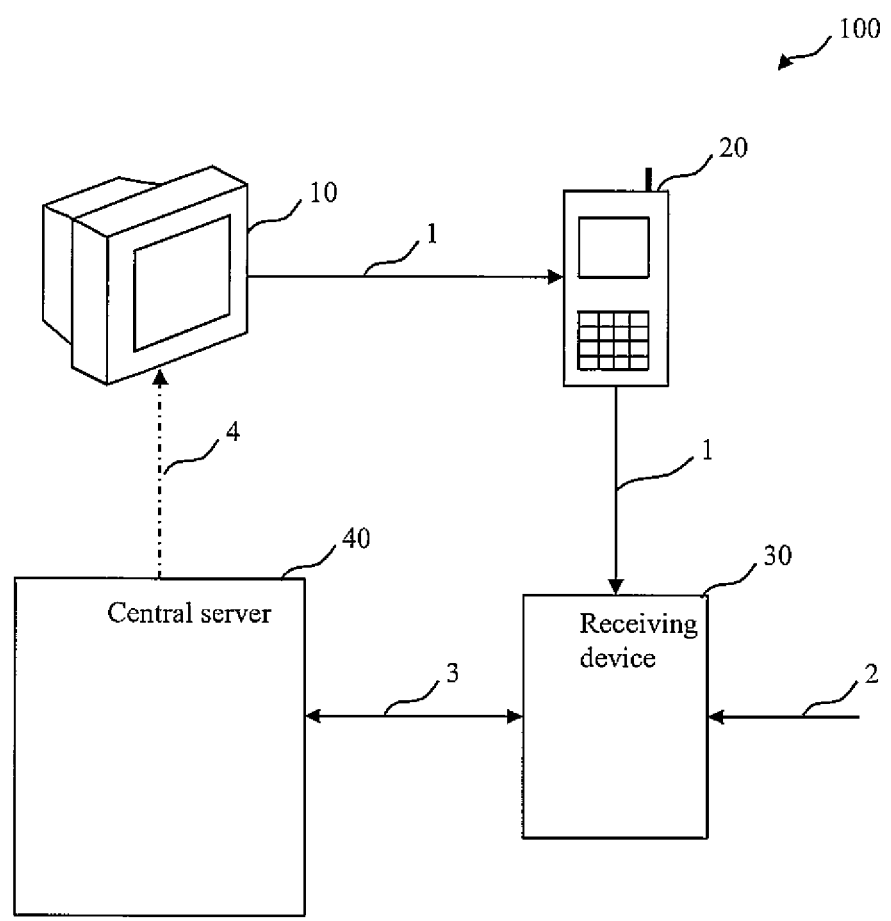
FIG. 1 shows an embodiment of a network system for exchanging cryptocurrencies between a user account and a receiving account.

In addition to the examples from the Brief Summary, the following examples are also presented.

According to a first aspect, a network system for transferring cryptocurrencies between a user account of a user and a receiving account is suggested. The network system comprises an offline user computing device being configured to generate a token, the token including information of an amount of cryptocurrency to be transferred from the user account to the receiving account and information of a first password for enabling the transfer, and to sign the token with a private key, a portable user storage device being configured to store the signed token, and a receiving device being configured to receive the signed token from the portable user storage device, to authenticate the user based on the signed token, to receive a second password, to compare the first password and the second password for enabling the transfer and to transfer the amount of cryptocurrency from the user account to the receiving account based on the information included in the token.

According to a second aspect, a method for transferring cryptocurrencies between a user account and a receiving account is suggested. The method comprises the following steps: generating, by an offline user computing device, a token, the token including information of an amount of crypto currency to be transferred from the user account to the receiving account and information of a first password for enabling the transfer, signing, by the offline user computing device, the token with a private key, storing the signed token on a portable user device, receiving, by a receiving device, the signed token from the portable user storage device, authenticating, by the receiving device, the user based on the signed token, receiving, by the receiving device, a second password, comparing the first password and the second password for enabling the transfer, and transferring, by the receiving device, the amount of cryptocurrency from the user account to the receiving account based on the information included in the token.

According to a third aspect, the invention relates to a computer program comprising a program code for executing at least one step of the method of the third aspect for exchanging cryptocurrencies between a user account and a receiving account when run on at least one computer.

According to an embodiment, the offline user computing device and the portable user storage device are physically separated entities.

According to a further embodiment, the private key is associated with a public address of the user.

According to a further embodiment, the receiving device is configured to check, for authenticating the user, whether the private key used for signing the token is associated with the public address of the user.

According to a further embodiment, the network system further comprises a central server, wherein the receiving device is configured to communicate with the central server for authenticating the user and for transferring the amount of cryptocurrency.

According to a further embodiment, the receiving device and the central server are configured to communicate via an internet connection.

According to a further embodiment, the private key is stored in the offline user computing device.

According to a further embodiment, the password is a one-time password being associated with the transfer of the amount of cryptocurrency of the user account to the receiving account.

According to a further embodiment, the offline user computing device is configured to generate the first password as a hash value of a phrase being input to the offline user computing device.

According to a further embodiment, the offline user computing device is configured to receive, as an input, information of an actual quantity of cryptocurrency on the user account and/or an actual amount of cryptocurrency being transferred to the user account.

According to a further embodiment, the offline user computing device is configured, when generating the token, to compare the actual quantity of cryptocurrency on the user account with the amount of cryptocurrency to be transferred from the user account to the receiving account.

According to a further embodiment, the token includes information of the actual amount of cryptocurrency being transferred to the user account.

According to a further embodiment, the portable user storage device is one of a mobile phone, a flash memory, a USB flash drive, or a SD memory card.

Turning now to FIG. 1, this figure shows a network system 100 for exchanging cryptocurrencies between a user account and a receiving account.

The network system 100 comprises an offline user computing device 10, a portable user storage device 20, a receiving device 30 and a central server 40. The devices are physically separated entities.

The respective devices, e.g. the offline computing device, may be implemented in hardware and/or in software. If said device is implemented in hardware, it may be embodied as a computer or as a processor or as a part of a system, e.g. a computer system. If said device is implemented in software it may be embodied as a computer program product, as a function, as a routine, as a program code or as an executable object.

The offline user computing device 10 is configured to generate a token 1. The token 1 is generated in an offline mode of the offline user computing device 10. This means that the offline user computing device 10 is not connected to an external network like the internet. Thus, the offline user computing device 10 cannot be manipulated or otherwise compromised from external entities.

The generated token 1 includes information of an amount of cryptocurrency to be transferred from the user account to the receiving account and information of a first password for enabling the transfer. The first password can be chosen by the user or generated and announced to the user by the offline user computing device 10. The password may be a one-time password being associated with the transfer of cryptocurrency of the user account to the receiving account which means that the password might be valid only for the current transfer of crypto currency.

The offline user computing device 10 is further configured to sign the token 1 with a private key. The private key may be stored on the offline user computing device 10 and is not known or made public to any external device.

The generated and signed token 1 is then stored on the portable user storage device 20. The portable user storage device 20 may be a mobile phone, a flash memory, a USB flash drive, or a SD memory card being able to store the token.

At the location of the receiving device 30, for example at the place of a merchant, the receiving device 30 may build up a connection to the portable user storage device 20. This connection may be a direct physical connection, for instance as plug in or as a wired connection, or may be a wireless connection.

The receiving device 30 may then receive the signed token 1 from the portable user storage device 20. The receiving device 30 may authenticate the user based on the signed token 1.

The private key used for signing the token may be associated with a public address of the user. The receiving device 30 may be configured to check, for authenticating the user, whether the private key used for signing the token is associated with the public address of the user. For this purpose, the receiving device 30 may communicate 3 with the central server 40 via an internet connection.

When the authentication of the user is verified, the receiving device 30 may receive a second password 2. The second password 2 may be input to the receiving device 30. The first password and the second password 2 are compared and, when the second password 2 matches the first password, i.e. when the first password and the second password 2 are identical, the transfer may be enabled. Thus, the receiving device can initiate the transfer of the amount of crypto currency from the user account to the receiving account based on the information included in the token 1.

To ensure that the amount of cryptocurrency to be transferred from the user account to the receiving account is available on the user account, the offline user computing device 10 may be configured to receive, as an input 4, information of an actual quantity of the cryptocurrency on the user account and/or an actual amount of cryptocurrency being transferred to the user account. This may be done based on information from the central server 4 but without a connection between the offline user computing device 10 and the central server 4. For instance, the user can get the information of an actual quantity of the cryptocurrency on the user account and/or an actual amount of cryptocurrency being transferred to the user account using a public internet access point to connect to the central server 4. The information received from the central server 4 can then be input by hand or using a storage device to the offline user computing device 10.

In the following, specific examples of the network system will be described, still referring to FIG. 1.

The central server 40 may be part of a crypto currency distributed consensus network (DCN), for instance a Bitcoin or Bitcoin-based cryptocurrency DCN. The receiving device 30 may either communicate with the central server 40 or with the whole crypto currency DCN, for example via the central server 40 as a routing point. If using an online device, users in such networks may install an open-source DCN client that enables them to connect to the rest of the network and to participate in transactions. DCN users may participate in transactions through and receive payments in virtual pseudonyms of theirs called addresses. An address may represent the public (verification) part of a digital signature key-pair which is generated through the DCN client software. The corresponding signing or private key is used to authenticate the spending of coins that are owned by the address itself and is thus important to be kept secret, while the address or (verification) key is public such that other users can confirm the validity of transactions. Payments are performed through transactions, which may be digitally signed delegations of coins currently owned by an address C (assuming that these coins were acquired through one or more other transactions) to another address M. These transactions (i.e. as a token 1) are constructed in the client software in the offline user computing device 10 of the owner of C using the signing key that corresponds to the latter, and are subsequently released to the DCN 40, that will confirm (or timestamp) the payment. The owner of M can confirm that its payment has been confirmed via the information it receives from the DCN through its client, i.e. installed on the receiving device 20.

The receiving device 20 may have an Internet connection and may have installed a DCN client. The receiving device 20 may communicate using the address M.

The user may have acquired a set of Bitcoins or other cryptocurrency coins (in the following referred to as coins) to an address (pseudonym) C of his, and wishes to spend some of his coins with M. For this purpose, the user may use his offline user computing device 10 which is not required to have an Internet connection. The offline user computing device 10 may be for example a laptop, pc or tablet, on which the DCN client is installed. For performing transactions, address C with a signing (secret) key skC is used that was generated inside the offline user computing device 10.

As already explained, a publicly available central server 40 may be used to obtain information on whether a payment to an address (herein also referred to as account) has been confirmed or not.

A possibility of generating the token 1 will be described in the following.

The payment transaction through which an initial set of coins is transferred to the user account will be denoted as i_payment_ref. The initial set of coins can be transferred to the user account, identified as address C, for example via a third party. In Bitcoin and similar cryptocurrencies, all transactions are registered in a distributed timestamp server, also called blockchain, and are uniquely defined by the SHA256d hash of the transaction string P.

The offline user computing device 10 issues a DCN transaction, i.e., it uses the private key skC to digitally sign the following information into a new payment token 1:

$Sign_{skC}$[input: i_payment_ref, output: M (amount_M), C (amount_C), auth: auth_info]

i_payment_ref provides a reference to the transaction from where C acquired the coins that are to be transferred.

amount_M is the amount of cryptocurrency or coins (from the ones acquired in i_payment_ref), that will be transferred to the receiving account identified by address M.

amount_C is the change, that are to be transferred to either C or another address C' of the user.

auth_info is the part that authenticates the user to the receiver (owing the receiving device 30 and the receiving account) at the time where the payment takes place at the location of the receiving device 30.

To compute the auth_info the user chooses a passphrase, e.g., pass, and the offline user computing device 10 computes a hash of that pass, auth_info=hash(pass). In the case of Bitcoin DCN, auth_info can be part of the 80 byte long metadata field that aims to accommodate transaction-metadata purposes.

Figure 2:
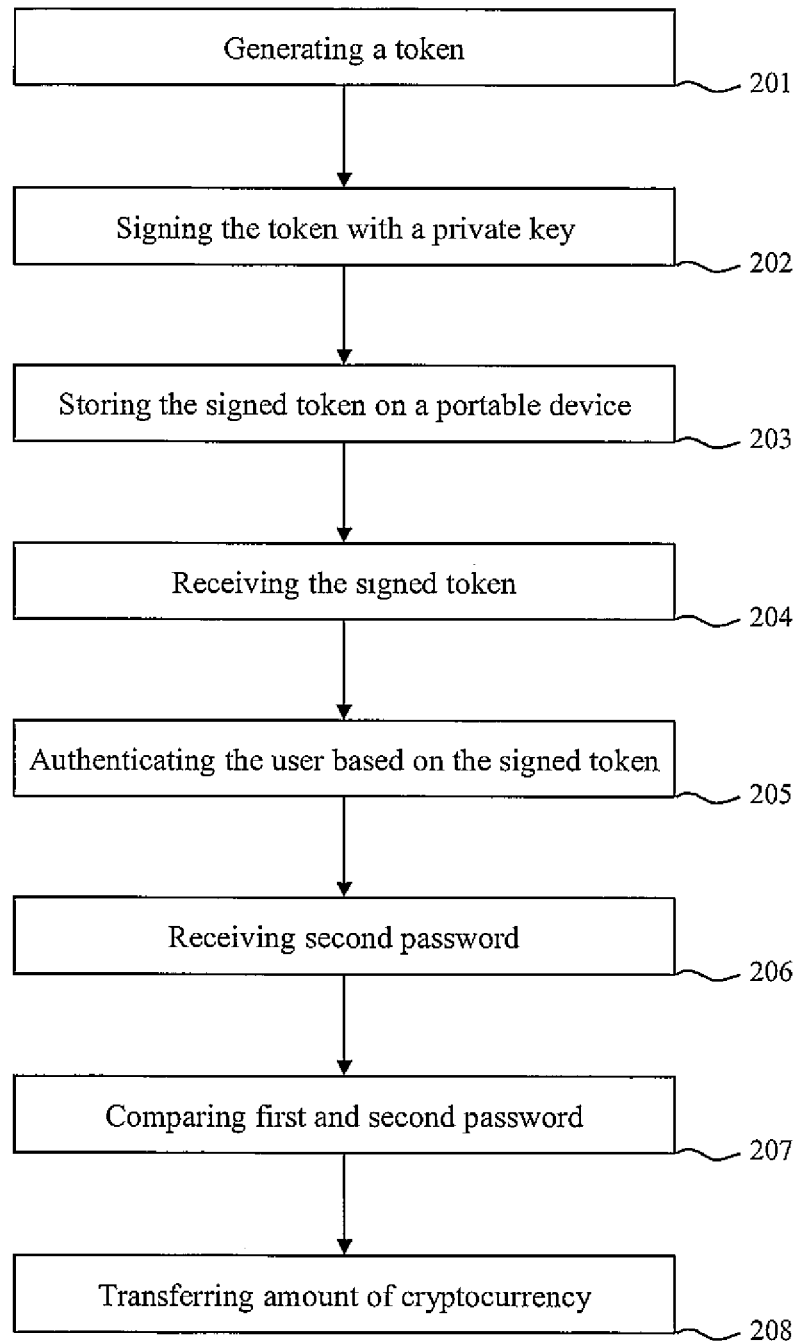
FIG. 2 shows an embodiment of a sequence of method steps for exchanging cryptocurrencies between a user account and a receiving account.

FIG. 2 shows an embodiment of a sequence of method steps for transferring cryptocurrencies between a user account and a receiving account. The method of FIG. 2 has the following steps 201-208.

In step 201, a token is generated by the offline user computing device 10. The token includes information of an amount of cryptocurrency to be transferred from the user account to the receiving account and information of a first password for enabling the transfer.

In step 202, the token is signed by the offline user computing device 10 with a private key.

In step 203, the signed token 1 is stored on the portable user device 20.

In step 204, the signed token 1 is received by the receiving device 30 from the portable user storage device 20.

In step 205, the user is authenticated 3 by the receiving device 30 based on the signed token 1.

In step 206, a second password 2 is received by the receiving device 30.

In step 207, the first password and the second password 2 are compared for enabling the transfer.

In step 208, the amount of cryptocurrency is transferred by the receiving device 30 from the user account to the receiving account based on the information included in the token 1.

Computerized devices may be suitably designed for implementing embodiments of the present invention as described herein. In that respect, it may be appreciated that the method described herein is largely non-interactive and automated. In exemplary embodiments, the method described herein may be implemented either in an interactive, partly-interactive or non-interactive system. The method described herein may be implemented in software (e.g., firmware), hardware, or a combination thereof. In exemplary embodiments, the method described herein is implemented in software, as an executable program, the latter executed by suitable digital processing devices. In further exemplary embodiments, at least one step or all steps of above method of FIG. 2 may be implemented in software, as an executable program, the latter executed by suitable digital processing devices. More generally, embodiments of the present invention may be implemented wherein general-purpose digital computers, such as personal computers, workstations, etc., are used.

Figure 3:
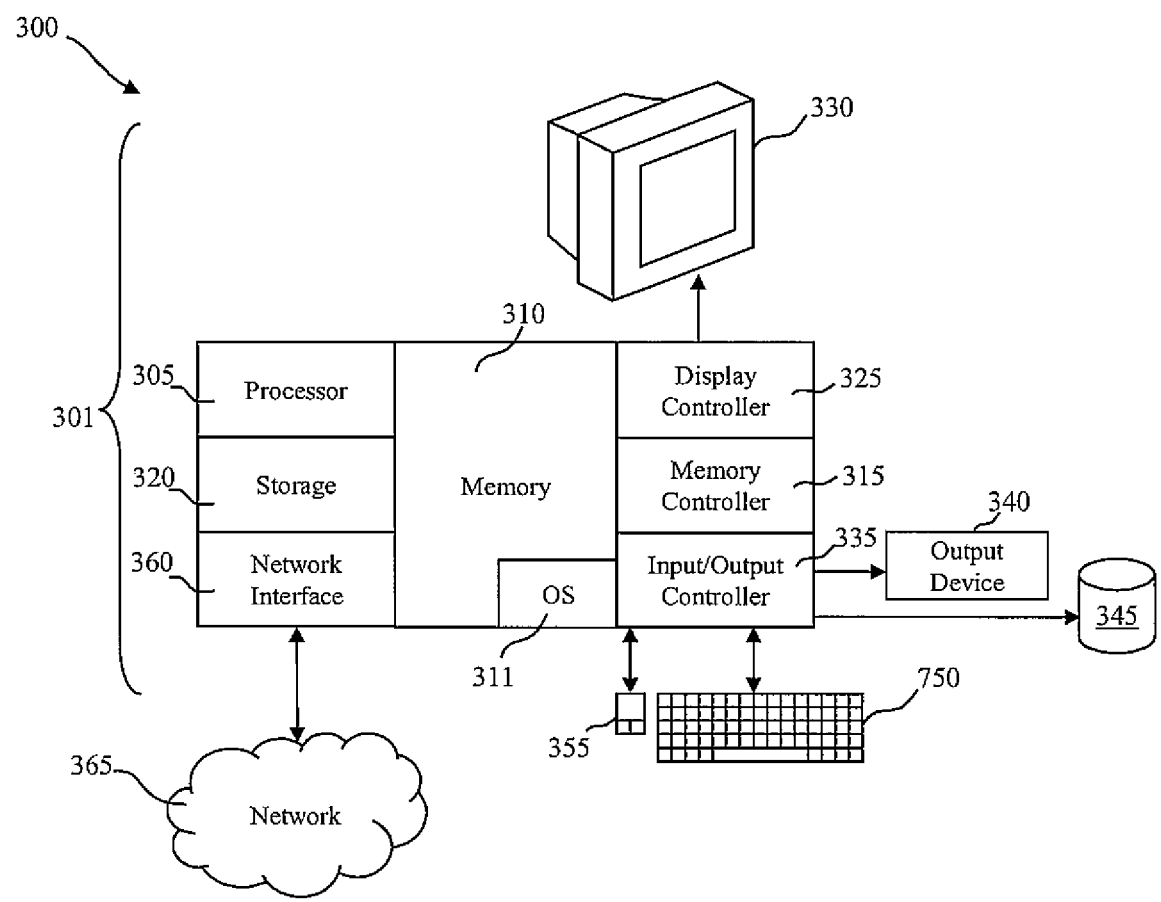
FIG. 3 shows a schematic block diagram of an embodiment of a system adapted for performing the method for exchanging cryptocurrencies between a user account and a receiving account.

For instance, the system 300 depicted in FIG. 3 schematically represents a computerized unit 301, e.g., a general-purpose computer. In exemplary embodiments, in terms of hardware architecture, as shown in FIG. 3, the unit 301 includes a processor 305, memory 310 coupled to a memory controller 315, and one or more input and/or output (I/O) devices 340, 345, 350, 355 (or peripherals) that are communicatively coupled via a local input/output controller 335. Further, the input/output controller 335 may be, but is not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 305 is a hardware device for executing software, particularly that stored in memory 310. The processor 305 may be any custom made or commercially available processor, a central processing unit (CPU), an auxiliary processor among several processors associated with the computer 301, a semiconductor based microprocessor (in the form of a microchip or chip set), or generally any device for executing software instructions.

The memory 310 may include any one or combination of volatile memory elements (e.g., random access memory) and nonvolatile memory elements. Moreover, the memory 310 may incorporate electronic, magnetic, optical, and/or other types of storage media. Note that the memory 310 may have a distributed architecture, where various components are situated remote from one another, but may be accessed by the processor 305.

The software in memory 310 may include one or more separate programs, each of which comprises an ordered listing of executable instructions for implementing logical functions. In the example of FIG. 3, the software in the memory 310 includes methods described herein in accordance with exemplary embodiments and a suitable operating system (OS) 311. The OS 311 essentially controls the execution of other computer programs, such as the method as described herein (e.g., FIG. 2), and provides scheduling, input-output control, file and data management, memory management, and communication control and related services. In particular, some of the steps of the method of FIG. 2 may be executed using different systems 300. For example, when executing the steps 201-203, the system 300 will not be connected to a network 365.

The method described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 310, so as to operate properly in connection with the OS 311. Furthermore, the method may be written as an object oriented programming language, which has classes of data and methods, or a procedure programming language, which has routines, subroutines, and/or functions.

Possibly, a conventional keyboard 350 and mouse 355 may be coupled to the input/output controller 335. Other I/O devices 340-355 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 335 for further processing. Sensor nodes are ideally small, consume low energy, are autonomous and operate unattended.

In addition, the I/O devices 340-355 may further include devices that communicate both inputs and outputs. The system 300 may further include a display controller 325 coupled to a display 330. In exemplary embodiments, the system 300 may further include a network interface or transceiver 360 for coupling to a network 365.

The network 365 transmits and receives data between the unit 301 and external systems. The network 365 is possibly implemented in a wireless fashion, e.g., using wireless protocols and technologies, such as WiFi, WiMax, etc. The network 365 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 365 may also be an IP-based network for communication between the unit 301 and any external server, client and the like via a broadband connection. In exemplary embodiments, network 365 may be a managed IP network administered by a service provider. Besides, the network 365 may be a packet-switched network such as a LAN, WAN, Internet network, etc.

If the unit 301 is a PC, workstation, intelligent device or the like, the software in the memory 310 may further include a basic input output system (BIOS). The BIOS is stored in ROM so that the BIOS may be executed when the computer 301 is activated.

When the unit 301 is in operation, the processor 305 is configured to execute software stored within the memory 310, to communicate data to and from the memory 310, and to generally control operations of the computer 301 pursuant to the software. The method described herein and the OS 311, in whole or in part are read by the processor 305, typically buffered within the processor 305, and then executed. When the method described herein (e.g. with reference to FIG. 2) is implemented in software, the method may be stored on any computer readable medium, such as storage 320, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable medium may be transmitted using any appropriate medium, including but not limited to wireless, wireline, optical fiber cable; RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 301, partly thereon, partly on a unit 301 and another unit 301, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams may be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

REFERENCE SIGNS 1 token
2 password
3 authentication
4 actual quantity of cryptocurrency/actual amount of cryptocurrency
10 offline user computing device
20 portable user storage device
30 receiving device
100 network system
201-208 method steps
300 system
301 computerized unit
305 processor
310 memory
311 operating system (OS)
315 memory controller
320 storage
325 display controller
340 display
345, 350, 355 input and/or output (I/O) devices
335 local input/output controller
350 keyboard
355 mouse
360 network interface or transceiver
365 network

The invention claimed is:

1. A method, comprising:
    receiving, by an offline user computing device using a portable device or using another storage device, while the offline user computing device is in an offline mode, an input, the input comprising information of an amount of blockchain cryptocurrency on a user account, where the input is based on information received by a user of the offline user computing device from a server;
    wherein the offline mode comprises the offline user computing device not being connected to an external network;
    receiving, by the offline user computing device, a phrase;
    generating, by the offline user computing device while the offline user computing device is in the offline mode, a first password as a hash value of the phrase;
    generating, by the offline user computing device while the offline user computing device is in the offline mode, a token, the token comprising information of an amount of blockchain cryptocurrency transferring from the user account to a receiving account, a change amount that is to be transferred to either an address of the user or another address of the user, and information of the first password;
    signing, by the offline user computing device while the offline user computing device is in the offline mode, the token with a private key;
    storing, by the offline user computing device, the signed token on the portable device, the portable device being different from the offline user computing device;
    connecting, by a receiving device, to the portable device;
    receiving, by the receiving device, the signed token from the portable device;
    authenticating, by the receiving device, the user of the offline user computing device based on the signed token;
    receiving, as input to the receiving device, a second password;
    comparing, by the receiving device, the first password from the token to the second password; and
    initiating a transfer, by the receiving device, of the amount of blockchain cryptocurrency indicated by the token from the user account to the receiving account, in response to the receiving device authenticating the user, and the first password being identical to the second password.

2. The method of claim 1, wherein the portable device on which the signed token is stored comprises one of a mobile phone, a flash memory, a USB flash drive, or a SD memory card.

3. The method of claim 1, wherein the storing is performed using a connection comprising one of a direct physical connection or a wireless connection.

4. The method of claim 1, wherein the offline user computing device and the portable device are physically separated entities.

5. The method of claim 1, wherein the private key is associated with a public address of the user.

6. The method of claim 1, wherein the private key is stored in the offline user computing device at a point when the offline user computing device is in the offline mode.

7. The method of claim 1, wherein the first password is a one-time password associated with the transfer of the amount of blockchain cryptocurrency from the user account to the receiving account.

8. The method of claim 5, wherein the private key is not known or made public to any external device.

9. The method of claim 1, further comprising signing, by the offline user computing device, the token with the private key with an input comprising:
    a reference to a transaction from where the address of the user acquired the blockchain cryptocurrency.

10. The method of claim 1, further comprising signing, by the offline user computing device, the token with the private key with outputs comprising:
    the amount of blockchain cryptocurrency; and
    the change amount, that is to be transferred to either the address of the user or the another address of the user.

11. The method of claim 1, further comprising signing, by the offline user computing device, the token with the private key with authorization information comprising:
    a part that authenticates the user to the receiving device at a time where the transferring takes place at a location of the receiving device.

12. The method of claim 1, further comprising obtaining, by the user, the information of the amount of blockchain cryptocurrency on the user account and/or an amount of blockchain cryptocurrency transferring to the user account using a public internet access point to connect to the server having the information.

13. The method of claim 12, further comprising:
    inputting, by the user to the offline user computing device by hand, the information of the amount of blockchain cryptocurrency on the user account and/or the amount of blockchain cryptocurrency transferring to the user account.

14. The method of claim 13, further comprising receiving, by the offline user computing device, the information of the amount of blockchain cryptocurrency on the user account and/or the amount of blockchain cryptocurrency transferring to the user account without a connection between the offline user computing device and the server.

15. The method of claim 1, where generating the token further comprises comparing, by the offline user computing device when generating the token, an amount of blockchain cryptocurrency transferring to the user account to the amount of cryptocurrency transferring from the user account to the receiving account, to ensure that the amount of cryptocurrency transferring from the user account to the receiving account will be available on the user account.

16. The method of claim 1, wherein transactions associated with the blockchain cryptocurrency, including the transfer, are registered in a distributed timestamp server, and are uniquely defined by a SHA256d hash.

17. A method, comprising:
    receiving, by an offline user computing device using a portable device or using another storage device, while the offline user computing device is in an offline mode, an input, the input comprising information of an amount of blockchain cryptocurrency on a user account, where the input is based on cryptocurrency information received by a user of the offline user computing device from a server;
    wherein the offline mode comprises the offline user computing device not being connected to an external network;
    receiving, by the offline user computing device, a phrase;
    generating, by the offline user computing device while the offline user computing device is in the offline mode, a first password as a hash value of the phrase;
    generating, by the offline user computing device while the offline user computing device is in the offline mode, a token, the token comprising information of an amount of blockchain cryptocurrency to be transferred from the user account to a receiving account, a change amount that is to be transferred to either an address of the user or another address of the user, and information of the first password;

signing, by the offline user computing device while the offline user computing device is in the offline mode, the token with a private key;

storing, by the offline user computing device, the signed token on the portable device, the portable device being different from the offline user computing device;

connecting, by a receiving device, to the portable device;

receiving, by the receiving device, the signed token from the portable device;

authenticating, by the receiving device, the user of the offline user computing device based on the signed token;

receiving, as input to the receiving device, a second password;

comparing, by the receiving device, the first password from the token to the second password; and initiating a transfer, by the receiving device, of the amount of blockchain cryptocurrency indicated by the token from the user account to the receiving account, in response to the receiving device authenticating the user, and the first password being identical to the second password.

18. A method, comprising:

receiving, by an offline user computing device using a portable device or using another storage device, while the offline user computing device is in an offline mode, an input, the input comprising information of an amount of blockchain cryptocurrency on a user account, and/or an amount of blockchain cryptocurrency transferring to the user account, where the input is based on information received by a user of the offline user computing device from a server;

wherein the offline mode comprises the offline user computing device not being connected to an external network;

receiving, by the offline user computing device, a phrase;

generating, by the offline user computing device while the offline user computing device is in the offline mode, a first password as a hash value of the phrase;

generating, by the offline user computing device while the offline user computing device is in the offline mode, a token, the token comprising information of an amount of blockchain cryptocurrency to be transferred from the user account to a receiving account, a change amount that is to be transferred to either an address of the user or another address of the user, and information of the first password;

signing, by the offline user computing device while the offline user computing device is in the offline mode, the token with a private key;

storing, by the offline user computing device, the signed token on the portable device, the portable device being different from the offline user computing device;

connecting, by a receiving device, to the portable device;

receiving, by the receiving device, the signed token from the portable device;

authenticating, by the receiving device, the user of the offline user computing device based on the signed token;

receiving, as input to the receiving device, a second password;

comparing, by the receiving device, the first password from the token to the second password; and initiating a transfer, by the receiving device, of the amount of blockchain cryptocurrency indicated by the token from the user account to the receiving account, in response to the private key used when signing the token being associated with a public address of the user and the user being authenticated, and the first password being identical to the second password;

wherein transactions associated with the blockchain cryptocurrency, including the transfer, are registered in a distributed timestamp server, and are uniquely defined by a SHA256d hash.

\* \* \* \* \*